A. BRADY.
Car Wheel.
No. 42,832.  Patented May 24, 1864.
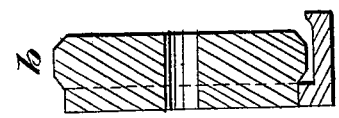
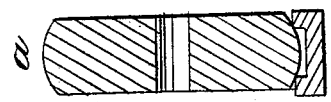
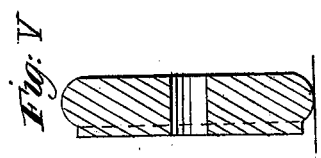
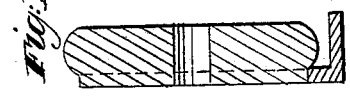
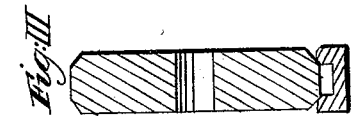
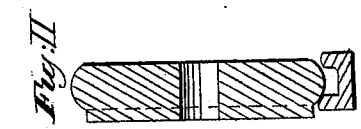
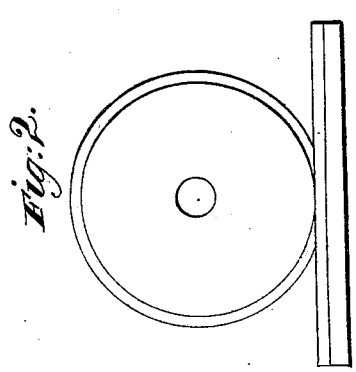
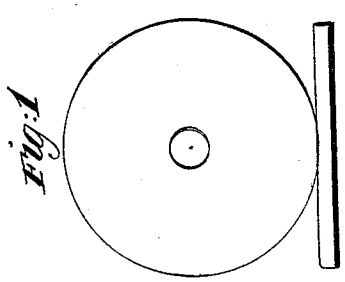
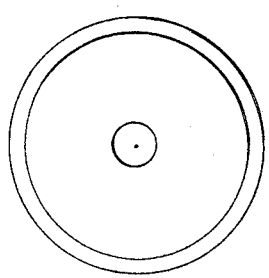
Witnesses
Inventor
Alfred Brady

UNITED STATES PATENT OFFICE.

ALFRED BRADY, OF NEW YORK, N. Y.

IMPROVED TIRE FOR VEHICLES.

Specification forming part of Letters Patent No. 42,832, dated May 24, 1864.

*To all whom it may concern:*

Be it known that I, ALFRED BRADY, of the city, county, and State of New York, have invented a new and improved rim or tire for wheels of vehicles to run on pavements or common roads that are crossed or used by railroads using iron rails; and I do hereby declare that the following is a full and exact description thereof, reference being had to the accompanying drawings and figures and letters of reference marked thereon, forming part of this specification.

Figure I is a side view of a wheel with the improved tire on. Fig. II is a front elevated view of the same wheel and tire resting upon the grooved rail. Fig. IV is a front view of of the same wheel and tire resting upon an L-rail. Fig. V is a like view of the same wheel and tire resting upon a common road or pavement.

The nature of my invention and improvement consists in so forming the periphery or exterior surface of the rim or tire as to enable a wheel bound therewith to cross the iron rails of railroad-tracks and to get upon and off the track easier than wheels can do bound with ordinary tire or rims, and with less liability to break or strain the wheel or other parts of the vehicle, and also enables the wheel to run equally well upon pavements, common roads, or railroad-tracks; and this I accomplish by making the rim or tire wider than ordinary, and composed of two or more surfaces of different diameters.

To enable those skilled in the business to make and use tires with my invention and improvement, I will proceed to describe its construction and operation. I make the rim from the same materials used to make ordinary tire, but I make it wider and of two or more surfaces, having different diameters.

The higher surface, or the one having the greatest diameter, I make a little wider than the groove in the rail of the railroad-track, and convex, as seen at Figs. II, IV, and V, so that when the wheel having this tire on is running upon the common road or pavement it runs upon the convex surface; but when running upon the grooved rail the convexed surface near its edges rests or runs upon the elevated sides of the grooved rail, and the higher or middle part of the convex surface extends a little distance down into the groove and guides the wheel in the track; but, as the higher or convex surface at or near its edges rests upon the elevated sides of the groove of the track, it requires much less force to turn the wheel off the track, when desired, than a wheel with the ordinary tire that runs in the bottom of the groove, presenting a perpendicular side to the almost perpendicular side of the groove of the track, requiring the wheel to be lifted nearly straight up to get it out of the groove to turn off, and very frequently breaking the axle or other parts of the vehicle. The lower surface, or the one having the least diameter, I make a plane surface, and narrower. This lower surface is for the tire to run upon when running upon the L-rail, or rail having but one elevated side, as seen at Fig. IV and letter $b$, giving the wheel a plane surface to run on the rail, and the higher surface acting as a guide to guide it on the track, and as the higher surface is convex it offers but slight resistance to the wheel being turned off the track when required. I make the higher surface from half an inch to one and a half inches higher than the lower surface. It may be made higher, if desired, or lower. The edges of the higher or convex surface of the tire may, instead of being made convex, be chamfered off and that part of the tire left sloping, thus making what I call the higher or convex surface consist of three plane surfaces, as seen at letter $b$ and Fig. III.

In making wrought-iron or steel tires or rims, they may have the required shape given them at the rolling-mill where tires are made, by shaping the rollers so as to give their exterior surface or periphery the required form; or the wheel itself may be made of metal, making the exterior surface or periphery of the rim as above described.

As the L-rail is seldom used, tire conforming in width and exterior surface to either description of the higher or convex surfaces hereinbefore described, as seen at letter $a$, Fig. III, may be made and used on grooved rails without combining it with the lower or plane surface.

What I claim as my invention and improvement, and desire to secure by Letters Patent, is—

The making, using, and constructing rims or tire for wheels with a combination of surfaces of different diameters having the surfaces of a number of plane surfaces, or of plane and convex surfaces combined, as set forth and described in the foregoing specification.

ALFRED BRADY.

Witnesses:
   E. A. L. ROBERTS,
   GEO. WALLACE.